US012792709B2

(12) United States Patent
Yarin et al.

(10) Patent No.: US 12,792,709 B2
(45) Date of Patent: Nov. 10, 2026

(54) MODULAR IDENTITY VERIFICATION SYSTEM AND METHOD

(71) Applicant: THALES DIS USA, INC., Austin, TX (US)

(72) Inventors: Paul Yarin, Closter, NJ (US); Neville Pattinson, Alexandria, VA (US); Amol Deshmukh, Austin, TX (US); Scott Six, Gloucester, VA (US)

(73) Assignee: THALES DIS FRANCE SAS, Meudon (FR)

( * ) Notice: Subject to any disclaimer, the term of this patent is extended or adjusted under 35 U.S.C. 154(b) by 138 days.

(21) Appl. No.: 18/489,988

(22) Filed: Oct. 19, 2023

(65) Prior Publication Data

US 2025/0131075 A1 Apr. 24, 2025

(51) Int. Cl.
*G06F 21/32* (2013.01)
*G06Q 50/40* (2024.01)

(52) U.S. Cl.
CPC ............. *G06F 21/32* (2013.01); *G06Q 50/40* (2024.01)

(58) Field of Classification Search
None
See application file for complete search history.

(56) References Cited

U.S. PATENT DOCUMENTS 9,501,882 B2 * 11/2016 Saravanan ............... G07C 9/28
11,950,101 B2 * 4/2024 Villanueva Gaviola ..................... H04W 12/02
2019/0050626 A1 * 2/2019 Berini ..................... G06F 21/34
2020/0145219 A1 * 5/2020 Sebastian .................. H04L 9/50

FOREIGN PATENT DOCUMENTS

CA 2836472 A1 11/2012
WO WO-2016028142 A1 * 2/2016 ............. G06F 21/32

OTHER PUBLICATIONS

International Search Report (PCT/ISA/210) and Written Opinion (PCT/ISA/237) mailed on Jan. 29, 2025 by the European Patent Office as the International Searching Authority for the corresponding International Application pursuant to the PCT N°PCT/EP2024/079040—[13 pages].

* cited by examiner

*Primary Examiner* — Brandon Hoffman

(57) ABSTRACT

A modular identity verification system includes an agent interface module (AIM) that interacts with at least one traveler interface module and one or more processors using computer instructions which when executed by the one or more processors causes the one or more processors to perform the function of arrayed parallel processing of traveler biometric inputs and credential inputs from the at least one traveler interface module and from a second traveler interface module. The traveler interface module can have one or more processors configured for at least biometric capture and recognition and for document scanning of credentials. In some embodiments, the modular identity verification system further includes a visual signaling indicating system that indicates a status to an agent and at least a waiting traveler.

9 Claims, 11 Drawing Sheets

490

201

202

203

203

460

470

480

490

500

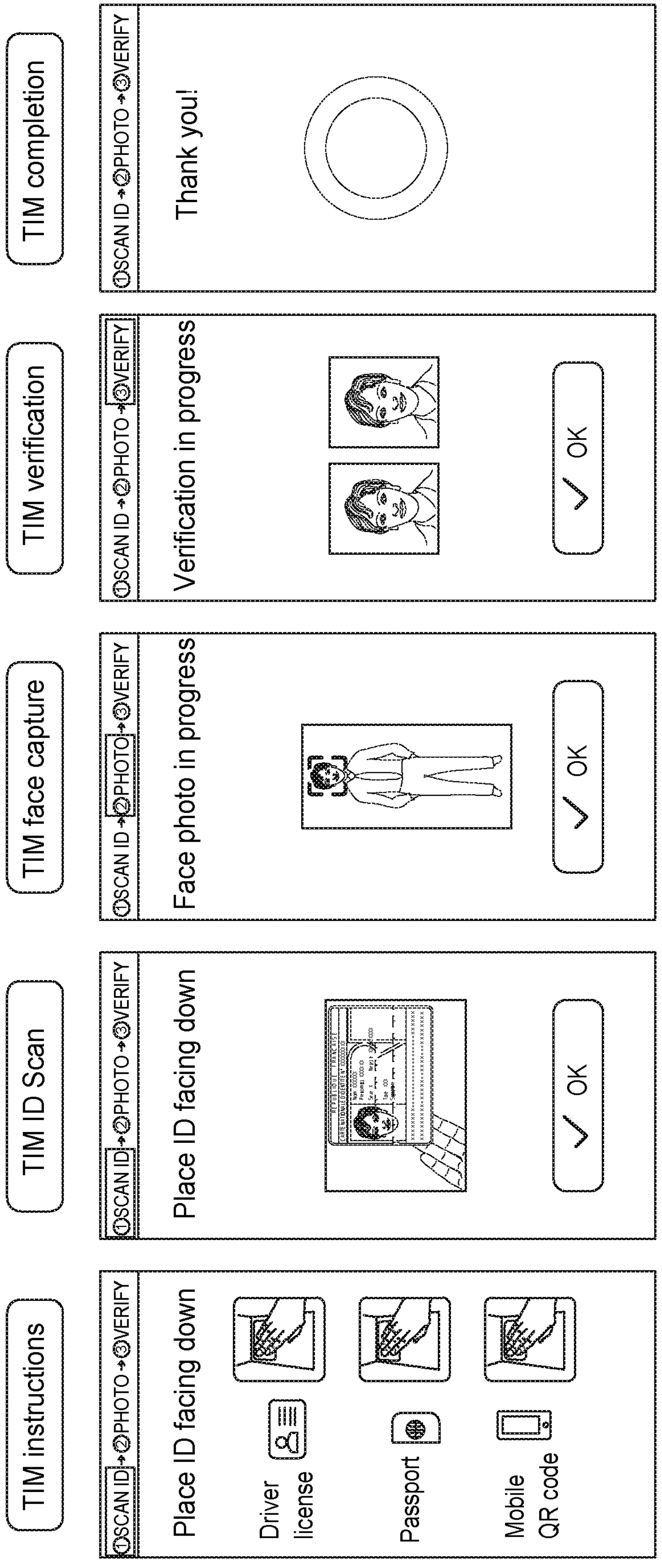
600 Fig. 6A
600 Fig. 6B
600 Fig. 6C
600 Fig. 6D
600 Fig. 6E

700

700

800

800

800

800

900

900

1001

MODULAR IDENTITY VERIFICATION SYSTEM AND METHOD

TECHNICAL FIELD

The present disclosure generally relates to identity verification systems. More particularly, but not exclusively, the present disclosure relates to a modular identity verification system and method.

BACKGROUND

Global air transport is projected to increase over 4% annually for the next 20 years, resulting in a doubling of passenger volume by 2036. This rapid growth creates major challenges for government security agencies that face diverse threats, impatient passengers, and a limited pool of skilled recruits.

The United States Transportation Security Agency reflect on these concerns by noting several key trends in its publication TSA Strategy 2018-2026, including that a) Adversaries remain committed to causing physical and economic harm to transportation networks with low cost and sophisticated tactics; b) Interconnected technologies enable an agile security model and effective operations; c) Risk of intrusion or disruption from state and non-state actors to critical transportation infrastructure remains high; d) Passengers are demanding customized and seamless travel experiences with on-demand and convenient services; e) The ability to recruit and retain talent with advanced technical skills, critical thinking and adaptability is increasingly difficult in a competitive labor market; and f) Passenger and cargo volumes are increasing with demand for new travel departure points and destinations in growing global regions.

Given the need to increase capacity with limited human resources, security agencies seek means to automate and accelerate the passenger screening process while preserving a high level of security. Shared security watchlists and standardized vetting procedures have enabled highly efficient background screening in advance of travel, but confirmation of a physical traveler's identity remains a critical but time-consuming step.

Current systems typically require a security officer to manually scan each traveler's identification documents to confirm their authenticity, while observing the traveler's face to confirm that it matches the credential. This process is slow, serial, and requires a human operator trained to detect a variety of security compromises. It is often the limiting factor in passenger throughput, creating "bottlenecks" during peak hours that result in frustration and costly delays.

In one existing attempt at a solution, Credential Authentication Technology (CAT) by IDEMIA Identity & Security North America is utilized by the Transportation Security Administration (TSA) to ensure ID authentication, and to display reservation verification and Secure Flight prescreening status at the airport security checkpoint. CAT is an effective tool for TSA officers, providing enhanced fraudulent ID detection capabilities while confirming the identity and flight information of travelers, and is currently being utilized at approximately 120 airport locations in the U.S.

When a CAT unit is in use, a TSA officer will ask travelers to provide their photo identification documents. It can be operated by having the TSA Officer scan these documents or by having the traveler insert their own documents. The latter is preferred for reducing both physical contact and the workload on the officer.

CAT is linked electronically to the Secure Flight database, which confirms travelers' flight details, ensuring they have an airline reservation for travel that day from that airport. CAT also displays the pre-screening status (such as TSA PreCheck® expedited screening).

While CAT and existing proposals for next generations of CAT improve throughput to a certain extent, they remain insufficient to handle the anticipated growth in travel while maintaining throughput, safety and convenience.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

In some embodiments, a modular identity verification system includes an agent interface module (AIM) that interacts with at least one traveler interface module (TIM) and one or more processors operatively coupled to memory having computer instructions which when executed by the one or more processors causes the one or more processors to perform certain functions. In some embodiments, the function can include arrayed parallel processing of (different) traveler biometric inputs and credential inputs from more than one TIM or from at least one TIM and from a second TIM. In some embodiments, the arrayed parallel processing can be of inputs from two, three or more TIMs. In other words, an independent AIM can process both biometric inputs and credential inputs from a traveler at a single independent TIM and can also process both biometric inputs and credential inputs from different travelers entering inputs at any number of separate independent TIMs where the AIM performs parallel processing of the different traveler inputs.

The AIM and TIM or TIMs can interface or communicate with each other over a wired communication link or a wireless communication link. In some embodiments, the AIM and TIM or TIMs can communicate over a secure wireless communication network. In some embodiments, the TIM or TIMs can have a dedicated wired or wireless link to an AIM or a set of AIM units. In some embodiments, the AIM or AIMs can have electronic links to a Secure Flight database, which confirms travelers' flight details, ensuring they have an airline reservation for travel that day and other electronic links to databases that may include blacklists or other vital information for security.

In some embodiments, the function (performed by the AIM or TIM or both) includes indicating a status to an agent and/or a waiting passenger using visual signaling indicating system.

In some embodiments, the visual signaling indicating system is an elevated light producing a green light (or other visual cue) indicating to the waiting passenger to proceed towards the TIM (or towards an AIM or towards a combined AIM and TIM unit) or a red light indicating to the waiting passenger to continue to wait.

In some embodiments, the agent interface module further includes a transparent or translucent shield separating the agent interface module from the traveler interface module. The shield can be made of glass or plexiglass or other transparent or translucent material (such as Lucite plastic sheets by Lucite International, Inc.). The shield can address safety issues for both agents and travelers and reduce the transmission of airborne viruses and bacteria while still allowing the agents to visually verify and vet passengers.

In some embodiments, the agent interface module further includes a display presenting processed inputs in parallel from two or more traveler interface modules. Thus, the display at the AIM can present the results from scanning faces and scanning credentials from different travelers processed at different TIMs. The arrayed parallel processing of the different travelers processed at different TIMs can maintain a high level of security while vastly improving throughput without additional headcount for labor.

In some embodiments, the display can be mounted on an extensible and adjustable arm allowing the agent to adjust the positioning of the display. The adjustable display enables different sized agents to ideally accommodate for their different body heights or dimensions and further allows the agent to adjust and maneuver around the periphery of the AIM as they process one or more travelers/passengers.

In some embodiments, the travel interface module includes a single document-scanning surface for scanning multiple forms of credentials including phone displays, identity cards, and passports. Existing scanning devices are typically purpose-built to scan only specific documents. The presence of multiple, document-specific devices may create confusion for the traveler in terms of presenting their credentials for scanning. The single document-scanning surface is intended to serve as a universal scanning device that enables a traveler to present their credential with greater flexibility (through software) with easier presentation, acceptance and processing of credentials of different formats from different travelers. Again, this universal or single document-scanning surface improves throughput by giving travelers ease of use and creating less confusion at the time of presentation of credentials at the TIM.

In some embodiments, the agent interface module further includes a hot-swappable battery system enabling continued usage without wired power. The battery system enables continued usage of the AIM even under conditions of power outages while still providing the flexibility of a modular architecture.

In some embodiments, the agent interface module further includes a dedicated agent-facing document scanner that scans multiple forms of credentials. The agent-facing document scanner can be similar to the universal scanner referenced above with respect to the TIM. In some embodiments, the agent interface module can further include a separate identity scanner accessible only to the agent. As the agent will be more familiar with the functions of separate scanning devices, the confusion experienced by travelers in scanning credentials is not as much of an issue for agents. In certain instances, having a dedicated identity scanner of a certain format may provide a more efficient processing flow for the agent.

In some embodiments, the agent interface module is co-located in modular fashion with one, two, three or more traveler interface modules. In some embodiments, the co-located AIM and TIM units are considered a combined unit, yet the AIM and TIM units are in essence independent and modular. In some embodiments, the agent interface module is co-located in modular fashion with just one traveler interface module. In some embodiments, the agent interface module is a standalone unit that interfaces with one, two, three or more traveler interface modules in in proximity to (or not co-located with) the agent interface module.

In some embodiments, the agent interface module has its own processor or processors and the traveler interface module or modules has or have its own respective processor or processors for at least face tracking, capture, and recognition and for document scanning. The agent interface module can have its own processor or processor that can handle bus intensive functions independent of the processor or processors at the agent interface module. If the AIM were to perform some of the bus intensive functions on a regular basis such as facial scanning (tracking, capture, matching, recognition, etc.) for multiple TIMs concurrently, then the throughput for the overall system may suffer. Thus, independent processors at the AIM and TIMs increases the overall throughput and flow for the system.

In some embodiments, the agent interface module physically resides separate from one or more traveler interface modules and yet is enabled to process inputs in parallel from two or more traveler interface modules. Accordingly, parallel processing of travelers at different TIMs by an AIM is not limited to co-located units.

In some embodiments, a modular identity verification system can include at least one traveler interface module (TIM) having one or more processors operatively coupled to memory having computer instructions for at least biometric capture and recognition and for document scanning and the system can further include an agent interface module (AIM) having one or more processors independent of the one or more processors of the TIM, where the one or more processors are operatively coupled to memory having computer instructions which when executed by the one or more processors causes the one or more processors to perform the functions of arrayed parallel processing of traveler biometric inputs and credential inputs from the at least one TIM and (optionally) from a second TIM.

In some embodiments, the system above further includes a visual signaling indicating system that indicates a status to an agent and at least a waiting traveler. In some embodiments, the indicating system can be a portion of the AIM. In some other embodiments, the indicating system can be a portion of the TIM. In yet other embodiments, the indicating system can be a portion of both the AIM and the TIM.

In some embodiments, the agent interface module further includes a transparent or translucent shield separating the agent interface module from the traveler interface module. In some embodiments, the shield can be curved to surround or substantially envelop the agent and protect the agent from airborne viruses, germs, and contaminants from multiple travelers being processed around the AIM.

In some embodiments, the traveler interface module includes a single document-scanning surface for scanning multiple forms of credentials including phone displays, identity cards, and passports and the agent interface module separately includes a single document-scanning surface for scanning multiple forms of credentials including phone displays, identity cards, and passports. In some embodiments, the AIM can further include additional scanners that are dedicated for a particular format such as an identity card scanner.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIGS. 6A, 6B, 6C, 6D, and 6E illustrate various user interfaces for the traveler interface module in accordance with the embodiments;

DETAILED DESCRIPTION

Figure 1A:
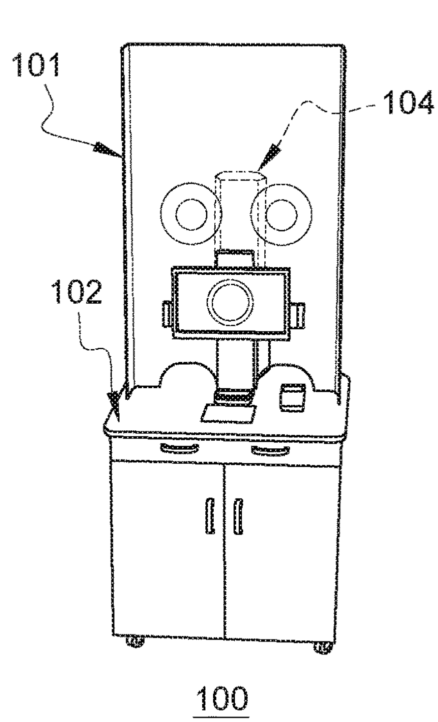
FIG. 1A depicts a modular identity verification system highlighting an agent interface module in accordance with the embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

Current systems typically require a security officer to manually scan each traveler's identification documents to confirm their authenticity, while observing the traveler's face to confirm that it matches the credential. This process is slow, serial, and requires a human operator trained to detect a variety of security compromises. It is often the limiting factor in passenger throughput, creating "bottlenecks" during peak hours that result in frustration and costly delays. The embodiments herein can leverage the limited availability of a security officer with experience and training, by enabling such security officer to process multiple passengers or travelers in parallel or can enable a less experienced security officer to rely on the embodiments to efficiently process multiple passengers or travelers in parallel with the same level of security performed by existing units that currently process passengers serially.

With the next Generation Credential Authentication Technology (CAT), TSA is evaluating innovative enhancements to CAT with additional capabilities that will enable a touchless experience utilizing one-to-one (1:1) face match techniques and acceptance of digital identification. The next generation CAT or CAT 2 intends to expand upon the original CAT and performs a 1:1 face match that confirms a live photo of the traveler matches the printed or electronic photo from their supplied credential and a digital identification. A face match option is expected to make the identity verification and validation process touchless and more secure. Such touchless identification verification and validation process would retain some of the existing bottlenecks without further improvements as noted herein.

As a parallel issue, the COVID-19 pandemic made evident the health risks inherent to the traditional screening process. Close physical contact between travelers and transportation security officers resulted in increased infection rates for the traveling public, as well as high fatality rates for security officers.

For these reasons, security agencies have expressed interest in convenient and user-friendly checkpoint terminals that enable "self-service" processing with reduced direct contact between passengers and officers. These systems must be able to verify travelers' identities rapidly and accurately, with a design that affords use by the maximum possible fraction of the traveling public. Development of terminals with these characteristics is a critical need for safe and secure travel, particularly in the aviation and airline industry.

Figure 1B:
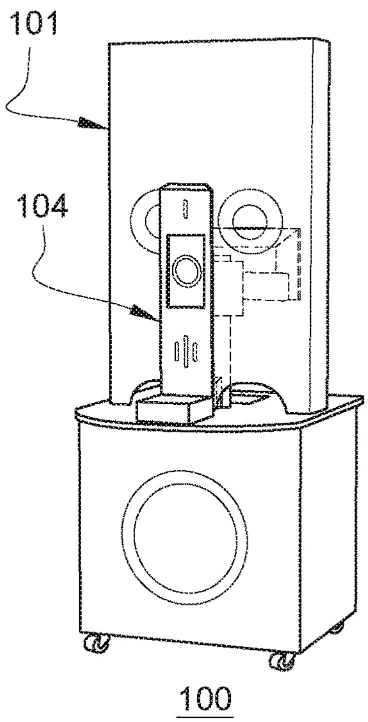
FIG. 1B depicts a modular identity verification system highlighting an traveler interface module in accordance with the embodiments.
Figure 1C:
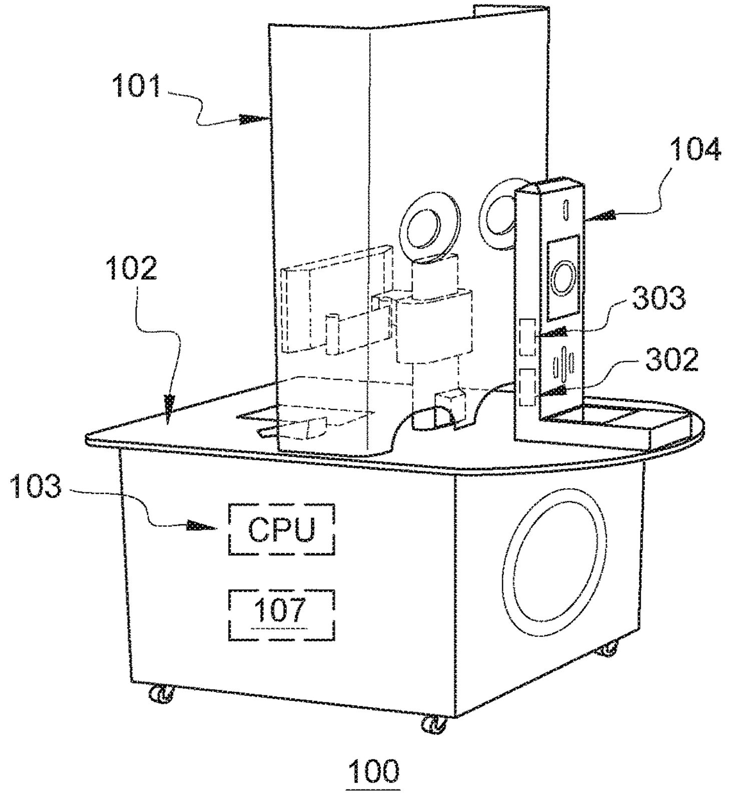
FIG. 1C depicts a modular identity verification system highlighting both an agent interface module and traveler interface module in accordance with the embodiments.

The proposed embodiments comprise a local network of modular devices that may be combined as a unit 100 as shown in FIGS. 1A, 1B, and 1C and other figures to support different physical configurations and security requirements. The primary components are the "Agent Interface Module" or "AIM" 102 and the "Traveler Interface Module" or "TIM" 104. The security agent interacts with the AIM 102 while the traveler uses the TIM 104. The AIM 102 supports a wide range of features for security screening, passenger assistance, and system maintenance, and is designed for use only by trained operators with security clearance. By contrast, the TIM 104 has a simple and accessible interface intended for the general public, much like an Automated Teller Machine or a travel ticketing kiosk.

In some embodiments, the AIM and TIM are independent modules that are remote from each other. In some embodiments as illustrated in the unit or system 100 of FIGS. 1A, 1B, and 1C, the AIM 102 and the TIM 104 are co-located. FIG. 1A illustrates the system 100 from the perspective of the AIM 102 or agent side while FIG. 1B illustrates the system from the 100 from the perspective of the TIM 104 or traveler or passenger's side. In some embodiments, the AIM 102 and TIM 104 are "separated" or segregated from each other via a shield 101 such as a transparent or translucent shield that enables the agent to view the traveler while still viewing and vetting the traveler during intake or verification processing. In some embodiments, the AIM 102 has its own processor or CPU 103 while the TIM 104 also has its own independent processor 303 as illustrated in FIG. 1C.

Figure 2A:
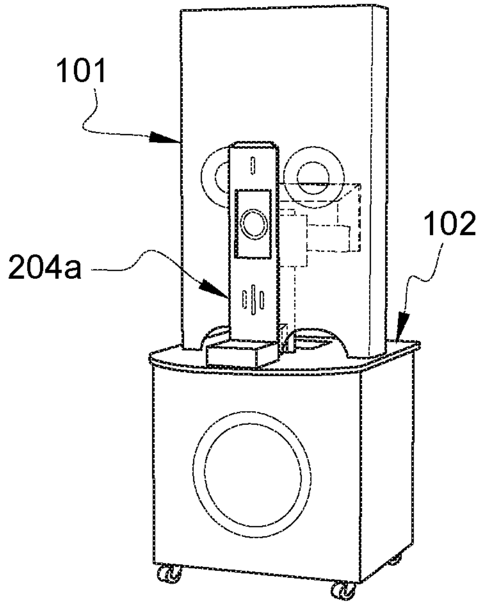
FIG. 2A depicts a modular identity verification system having an agent interface module and a traveler interface module co-located in accordance with the embodiments.
Figure 2B:
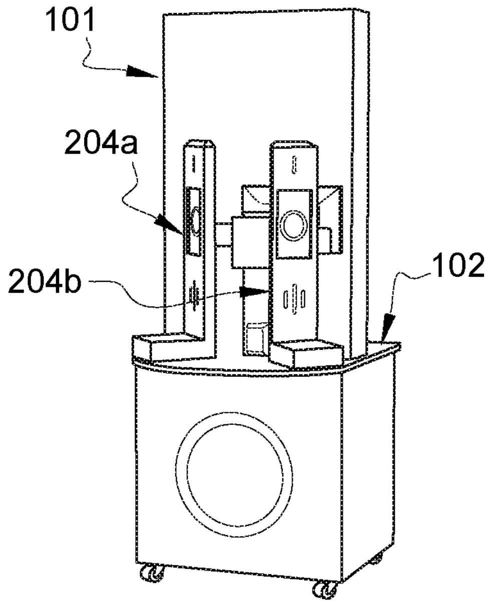
FIG. 2B depicts a modular identity verification system having an agent interface module and two (2) traveler interface modules co-located in accordance with the embodiments.
Figure 2C:
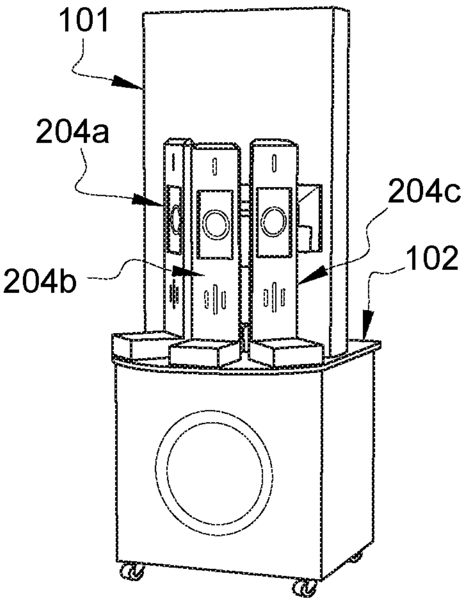
FIG. 2C depicts a modular identity verification system having an agent interface module and three (3) traveler interface modules co-located in accordance with the embodiments.
Figure 2D:
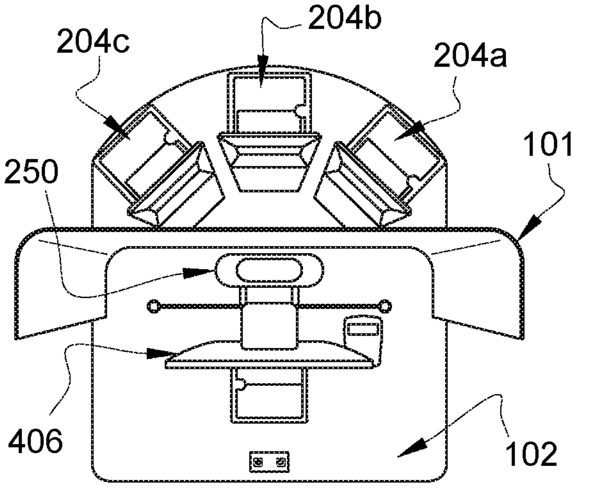
FIG. 2D depicts a top view of the modular identity verification system of FIG. 2C in accordance with the embodiments.

The embodiments shown resolve several problems encountered in current screening systems. For example, current systems allow only screening of only one passenger at a time. The embodiments herein allows for a single agent to screen two or three passengers in parallel as illustrated in the unit 202 of FIG. 2B or in the unit 203 of FIG. 2C or 2D. As these systems are modular and configurable, in some embodiments, a unit 201 as shown in FIG. 2A can have just a single AIM 102 and a single TIM 204*a* in one configuration. In another configuration, a unit 202 as shown in FIG. 2B can have a single AIM 102 and a first TIM 204*a* and a second TIM 204*b*. In yet another configuration, a unit 203 as shown in FIG. 2C can have a single AIM 102 and a first TIM 204*a*, a second TIM 204*b*, and a third TIM 204*c*. In each instance, the bank of TIMs (204*a*, 204*b*, and/or 204*c*) would be separated from the AIM 102 via a shield 101 as more clearly illustrated in the overhead or top view of FIG. 2D. As shown in FIG. 2D, the AIM 102 can include a display 406 for the agent to review inputs from the travelers entered at TIMs 204*a*, 204*b*, and/or 204*c*. Embodiments are not limited to just 3 TIMs per combined unit, and it is contemplated that more than 3 TIMs can also be configured to interface with a particular AIM if desired. The units (201, 202, or 203) can include a visual display or indicator 250 that can present a light or other indicator to either the traveler or the agent or both to prompt parties to either wait or step forward assist in the overall process flow.

Current systems support only single-passenger/single-agent topologies, limiting flexibility and throughput. The embodiments allow multiple, self-service terminals in the form of TIMs to be arrayed under the supervision of a nearby agent. As shown in FIGS. 2A-2D, the AIM and TIMs can be co-located, but other embodiments can have TIMs in remote or non-co-located locations that are still arrayed under the supervision of a nearby agent. In such instances, the TIM can be a stand alone unit such as the TIM 300 of FIG. 3A or the TIM 320 of FIG. 3B or part of a bank or banks 330 of stand alone units (330*a*, 330*b*, 330*c*, 330*d*, 330*e*, and 330*f*) as shown in FIG. 3C that can interface with an AIM using wireless communication or wired communication within a tethered range.

Figure 3A:
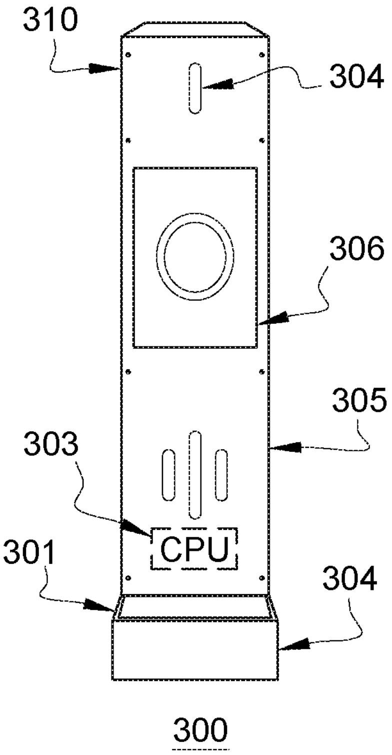
FIG. 3A depicts a stand alone traveler interface module in accordance with the embodiments.

In some embodiments, each TIM 300 as shown in FIG. 3A can include an enclosure 304 that can optionally include table top fasteners or other fasteners enabling the TIM 300 to mount to a surface (e.g., a floor, a stand, a table, etc.). The TIM 300 can further include a multi-document scanner 301, a processor or CPU 303, a removable maintenance cover 305, and a display 306. In some embodiments, the display 306 is a traveler touchscreen interface allowing a traveler to activate and touch inputs on the screen 306 as part of the screening process. In some embodiments, the touchscreen 306 or the scanner 301 can be configured to capture fingerprints, palm prints, or hand-prints as part of a biometric capture. The TIM 300 can further include a wide field-of-view (FOV) portrait face camera 304 that can easily capture a traveler's face from a wide area. In cases where there is ambiguity in the facial recognition processing, the fingerprint, palm print or hand print scanning can assist in a multi-modal process to help resolve such ambiguities. In some embodiments, the TIM 300 can also include iris recognition as yet another alternative for biometric verification or as part of a multi-modal process. Such iris recognition can be incorporated as part of the camera 304 or scanner 301 in some embodiments, but other embodiments can have a separate device for such iris scans. In some embodiments, the TIM 300 can include an indicator 310 such as an RGB signal LED.

Figure 3B:
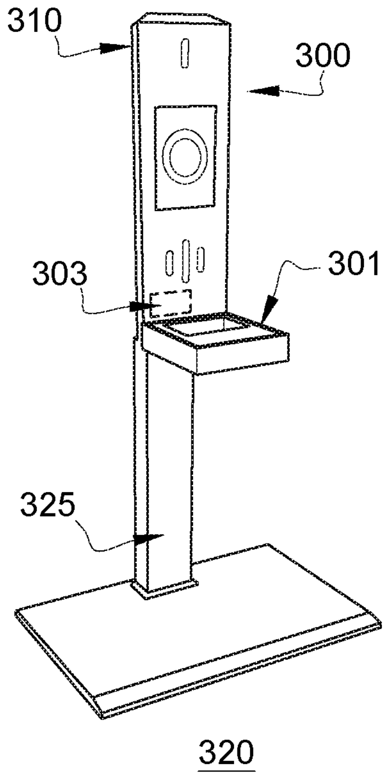
FIG. 3B depicts another stand alone traveler interface module on a stand in accordance with the embodiments.
Figure 3C:
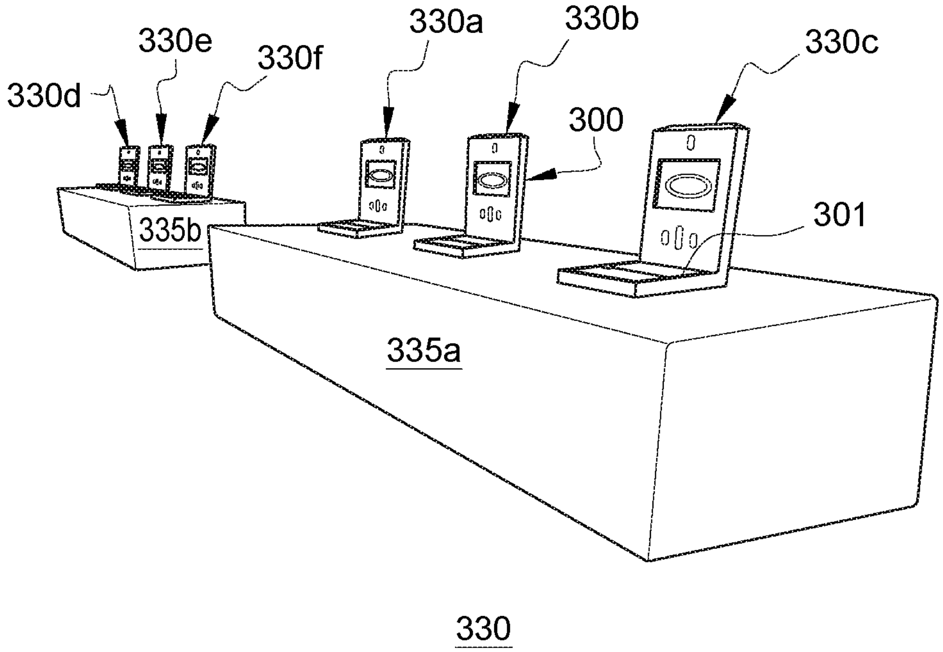
FIG. 3C depicts a bank or array of traveler interface modules in accordance with the embodiments.

In some embodiments as shown FIG. 3B, a unit 320 can include the TIM 300 mounted to a stand 325 as shown. In yet other embodiments as shown in FIG. 3C, banks 330 of TIMs (330*a*, 330*b*, 330*c* and 330*d*, 330*e*, and 330*f*) can be mounted to respective tables 335*a* and 335*b* as shown. Each bank of TIMs can be configured to interface and communicate with a single respective AIM. In some embodiments, multiple banks of TIMs can be configured to interface and communicate with a single AIM. Administrators of such systems can programmably set the linkage between the number of TIMs and respective AIMs as desired.

Current systems require travelers to recognize and employ multiple document scanners, causing error and frustration. The embodiments herein can employ a single document-scanning surface 301 in a TIM 300 for all credentials as shown in FIGS. 3A, 3B, and 3C.

Figure 4A:
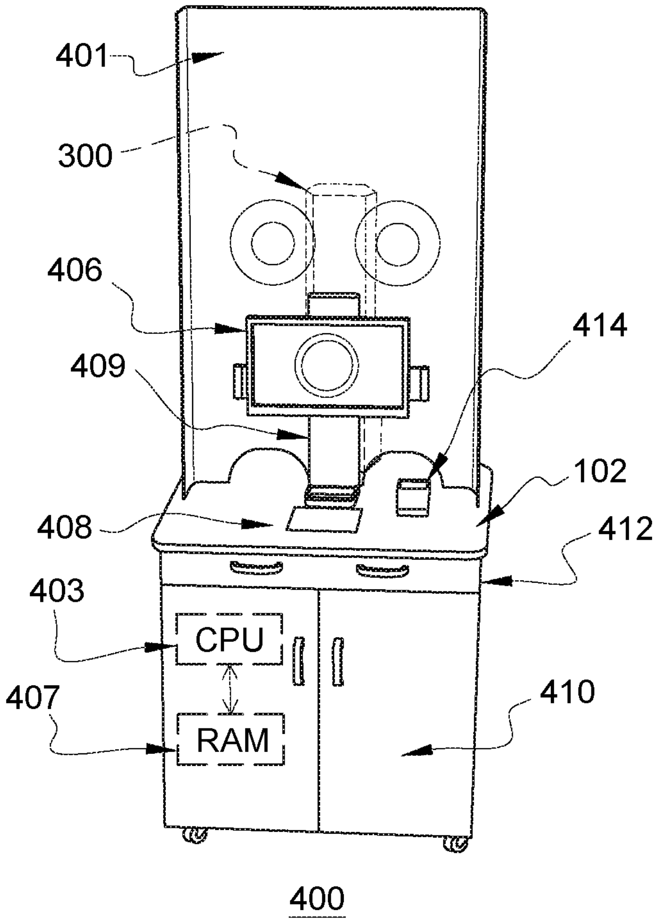
FIG. 4A illustrates a more detailed view of a combined agent interface module and traveler interface module in accordance with the embodiments.
Figure 4B:
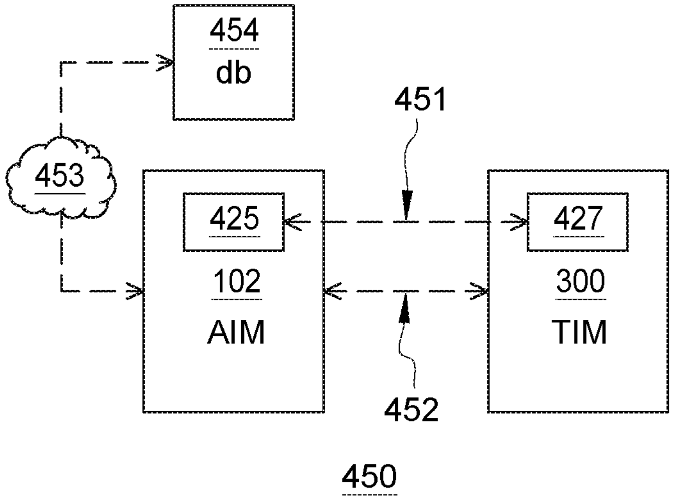
FIG. 4B illustrates a block diagram of the combined agent interface module and traveler interface module of FIG. 4A in accordance with the embodiments.
Figure 4C:
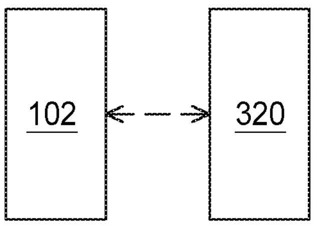
FIG. 4C illustrates a block diagram of an agent interface module interfacing with the stand alone traveler interface module on a stand of FIG. 3B in accordance with the embodiments.

In some embodiments, a unit 400 as illustrated in FIG. 4A can include an AIM 102 having a storage cabinet 410 that can house a processor, batteries and other components such as memory 407. The unit 400 can also include storage drawers 412. In some embodiments, the unit 400 can include a document scanner 408 similar to the scanner 301 used by the TIM 300. The scanner 408 can be a flush-mounted multi-document scanner. In some embodiments, the unit 400

(or AIM 102) can further include an agent secure card reader 414 separate from the scanner 408. The AIM 102 can also include an agent touchscreen interface 406 that can be mounted to an articulated display mount 409.

Since the system in accordance with the embodiments is modular, the AIM and TIM combinations can come in any number of configurations as illustrated by the systems 450, 460, 470, 480 and 490 in corresponding block diagrams in FIGS. 4B, 4C, 4D, 4E, and 4F. In the system 450 of FIG. 4B, an independent AIM 102 can interface with a single independent TIM 300 that may or may not necessarily be co-located with the AIM 102. The link between the AIM 102 and the TIM 300 can be a wireless link 451 using corresponding transceivers 425 and 427 and/or a wired link 452. The wireless link 451 can use any number of wireless protocols such as Bluetooth, WiFi, 4G, or 5G as examples. As noted previously, the AIM 102 can link to security databases or other information sources such as a database 454 via a network or cloud connection 453 using a LAN or WAN. In some embodiments as shown in the system 460 in FIG. 4C, an independent AIM 102 can interface with a single independent TIM 320 that is mounted on a stand as shown in FIG. 3B.

Figure 4D:
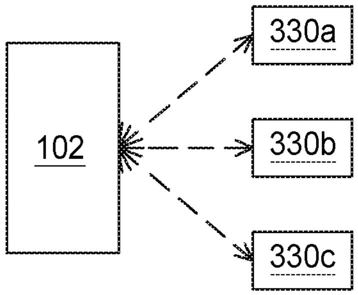
FIG. 4D illustrates a block diagram of an agent interface module interfacing with the array of traveler interface modules of FIG. 3C in accordance with the embodiments.

In some embodiments as shown in the system 470 in FIG. 4D, an independent AIM 102 can interface with three different TIMs (330*a*, 330*b*, and 330*c*) that can be located anywhere, but most likely mounted on a table 335*a* as shown in FIG. 3C.

Figure 4E:
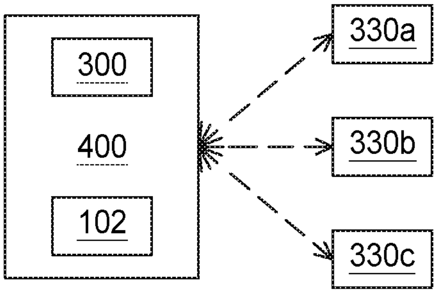
FIG. 4E illustrates a block diagram of the combined agent interface module and traveler interface module of FIG. 4A interfacing with the array of traveler interface modules of FIG. 3C in accordance with the embodiments.

In another configuration as illustrated by system 480 of FIG. 4E, a unit 400 similar to the unit 400 of FIG. 4A having both an AIM 102 and a TIM 300 can further interface with three different TIMs (330*a*, 330*b*, and 330*c*) of table 335*a* (for example).

Figure 4F:
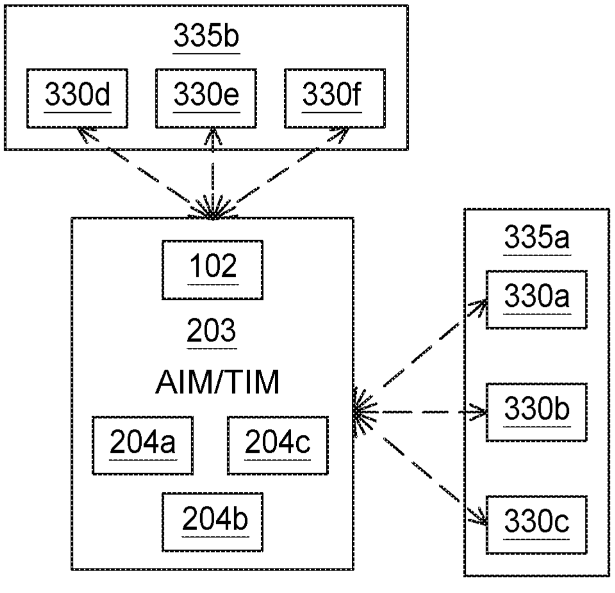
FIG. 4F illustrates a block diagram of the combined agent interface module and traveler interface modules of FIG. 2D interfacing with the array of traveler interface modules of FIG. 3C in accordance with the embodiments.

In yet another configuration as illustrated by system 490 of FIG. 4F, a system 203 (as shown in FIGS. 2C and 2D) having TIMs 204*a*, 204*b*, and 204C co-located with an AIM 102 that can further interface with remote (or non-co-located) TIMs such as TIMs 330*a*, 330*b*, 330*c* of table 335*a* (for example) and further interface with yet another three different TIMs (330*d*, 330*e*, and 330*f*) of table 335*b*. See the combination of the systems 203 and 330 of respective FIGS. 2D and 3C.

Current systems have limited accessibility and frequently require agent assistance. The embodiments can be configured to support users with limited vision, hearing, mobility, or cognition, as well as multiple different users of different heights and that speak and read different languages.

Current systems must change the height of passenger-facing displays in order to accommodate multiple agent heights. The embodiments herein enable the agent to adjust the interface height without affecting passenger interface height, as the passenger interface is independent of the agent interface.

Current systems can also lack any visible indication that the unit is ready for the next passenger. The embodiments herein can include an elevated signal light that indicates system status to an agent and to waiting passengers or travelers.

Figure 9A:
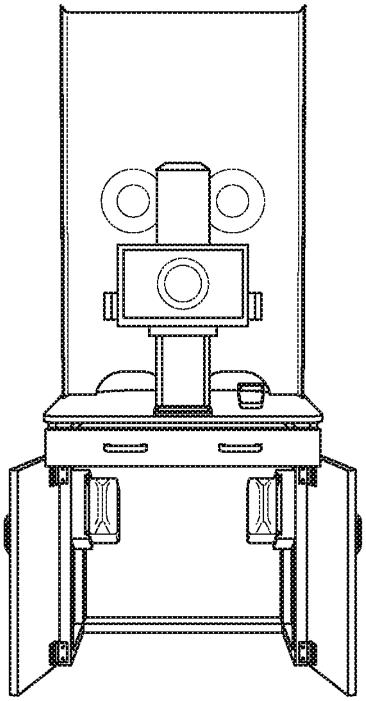
FIG. 9A illustrates a plan view of the agent interface module with a storage area and a hot swappable battery pack in accordance with the embodiments.
Figure 9B:
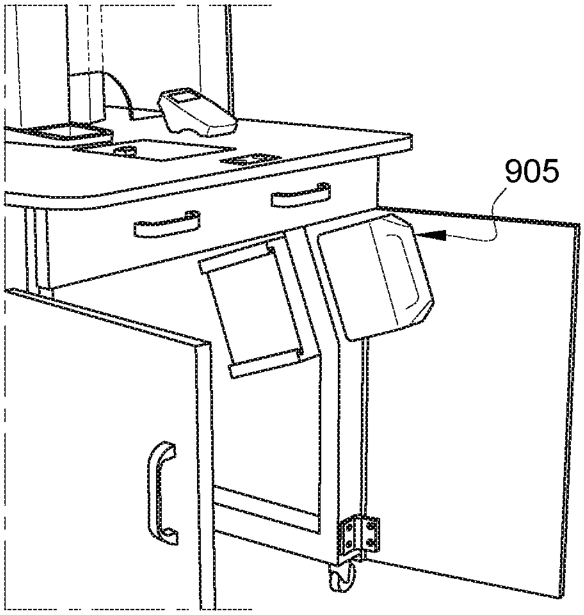
FIG. 9B illustrate a close up view of the hot swappable battery pack and the storage area of FIG. 9A in accordance with the embodiments.

Current systems can also have limited runtime if an electrical power connection is not available. Thus, in some embodiments herein, a system 900 as shown in FIGS. 9A and 9B can include a "hot-swappable" battery system 905 to allow continuous usage without wired power.

Current systems require a security agent to physically rotate document scanners to assist passengers. In some embodiments, a system herein can include a dedicated, agent-facing document scanner that can be employed to scan a passenger's ID if needed.

Current systems are difficult to transport due to size and weight. The embodiments herein can include folding handles and locking casters to support transport.

The primary benefit of creating separate AIM and TIM devices is the flexibility in configurations. While current systems have a similar, dual-interface approach, the embodiments herein enable one AIM to be connected to one, two, or three or more co-located TIM's if desired and/or with other TIMs that are not necessarily co-located. In addition, multiple TIM's can be positioned in banks separately from the AIM if suitable security can be maintained. In this way the embodiments herein support much greater flexibility and future expansion than a single terminal with dual interfaces.

Another advantage of the AIM/TIM architecture illustrated by the various embodiments is the ability to perform specific processing and peripheral communications on a separate processors or CPUs. Face tracking, capture, and recognition and document scanning are CPU and bus-intensive tasks. A lone AIM computer might slow down or create a bottleneck if processing data from multiple TIM's concurrently. Thus, a simple TIM and corresponding processor that performs the CPU and bus-intensive tasks will not interfere with the overall functions performed by a processor at an AIM.

Another advantage of the modular architecture is that the TIM units can be relatively low in cost and complexity as their functionality is limited. TIM units could be developed to use an embedded operating system and low-cost chips, and can be easier to cyber-secure than a combined AIM/TIM solution that has an AIM unit with additional complexity and connectivity. Thus, the resulting separation and independence of the TIMs can provide overall savings and security improvements.

As the AIM/TIM design allows a single agent to process multiple passengers in parallel, a smaller number of agents can support secure processing of a larger number of passengers. Thus, significant cost savings can be materialized by a security agency.

Since the AIM and the TIMs are separated, one agent can efficiently process multiple travelers to save time and cost. As passenger volume increases and as passengers become more familiar with self-service terminals, the flexibility of the embodiments herein can allow agencies to modify their passenger flows with minimal cost and complexity.

Figure 5:
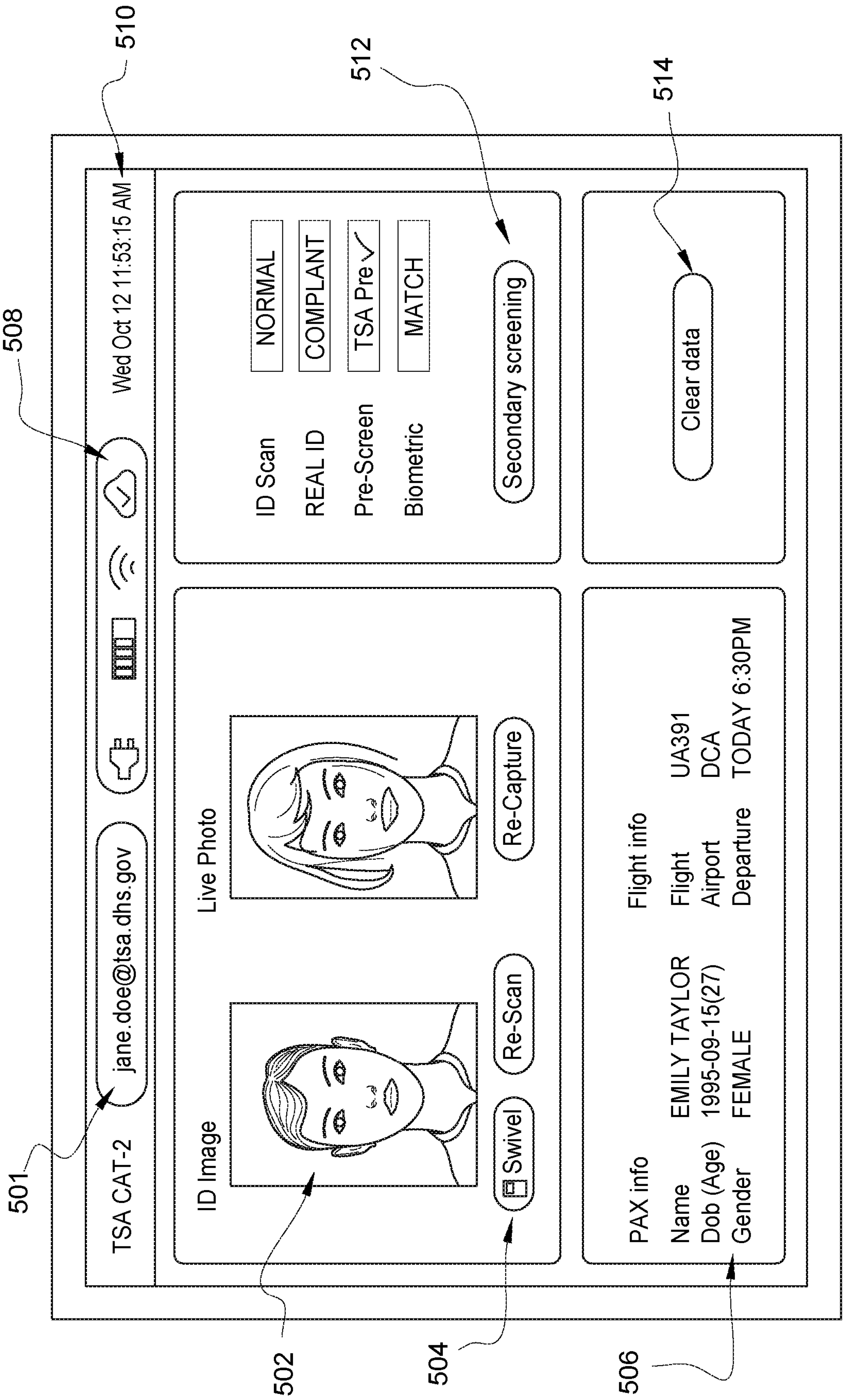
FIG. 5 illustrates a user interface for the agent interface module in accordance with the embodiments.

Referring to FIG. 5, an AIM software user interface 500 can include multiple components enabling an agent to quickly and efficient process one or more travelers individually or in parallel. The user interface 500 can include a section 501 for Agent ID information such as jane.doe@tsa.dhs.gov. Another section 502 can have a display that helps match an ID or (face) credential with a live face capture. The user interface 500 can also have another section 504 enabling multi-document scanner controls and controls for re-capturing live face images. The user interface 500 can further have a section 506 having traveler and flight information for a given traveler. The user interface 500 can include other useful sections such as a system status section 508, a system time section 510, a traveler screening result section 512, and a clear private data section 514.

Referring to FIGS. 6A, 6B, 6C, 6D, and 6E, various TIM user interfaces 600 are shown enabling a traveler or passenger to easily use and traverse the process of screening or verification. FIG. 6A can include instructions to a traveler to place different types of credentials facing down such as a driver's license, passport, or mobile device QR code. The user interface in FIG. 6B can further provide confirmation that the credential or ID is appropriately placed facing down. Such a system can have flexible software that enables the user to place the ID or credential in various positions (sideways, vertical, horizontal, etc., as long as it is facing down) and yet still allow the system to capture the relevant information notwithstanding variable positioning of the ID or credential by the traveler. The user interface 600 in FIG. 6C can also provide feedback that a live face capture is in progress or completed. The user interface 600 in FIG. 6D can further provide feedback that the verification is in progress (where the face from the credential can be compared with the live face capture from a camera). Once the process is completed, the user interface 600 in FIG. 6E can provide a message such a "Thank You" letting the traveler know that their verification has been completed.

Figure 7A:
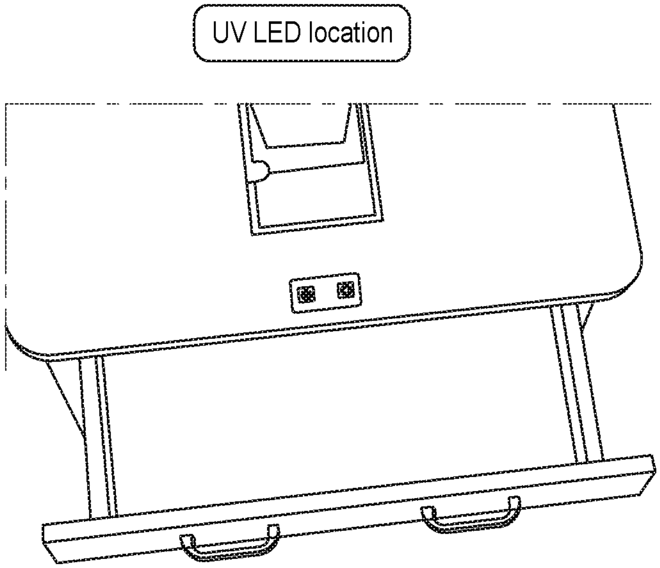
FIG. 7A illustrates a housing and cabinetry used as part of an agent interface module in accordance with the embodiments.
Figure 7B:
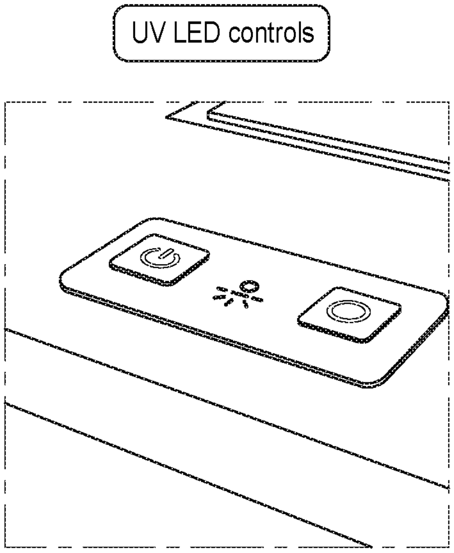
FIG. 7B illustrates a ultra-violet illumination activation system for the agent interface module in accordance with the embodiments.

In some embodiments, as illustrated by UV LED controls 700 of FIG. 7A and FIG. 7B, the AIM can optionally include agent controlled activation of UV LEDs to further verify certain security features that might be included in certain credentials. The UV LED lights can be installed within a drawer of the AIM or overall combined unit to enable sufficient shading from other ambient light and also reduce exposure of extraneous UV lights in certain instances.

In some embodiments, as illustrated by the various positions of the display 406 using the articulated display mount 409 in an AIM 102 of a system 800 shown in FIGS. 8A, 8B, 8C, and 8D, can allow an agent to maneuver and adjust such display for various scenarios involving one or more different travelers. The articulated display also allows agents of different sizes or heights to easily adjust the display for their comfort and efficiency.

Figure 10:
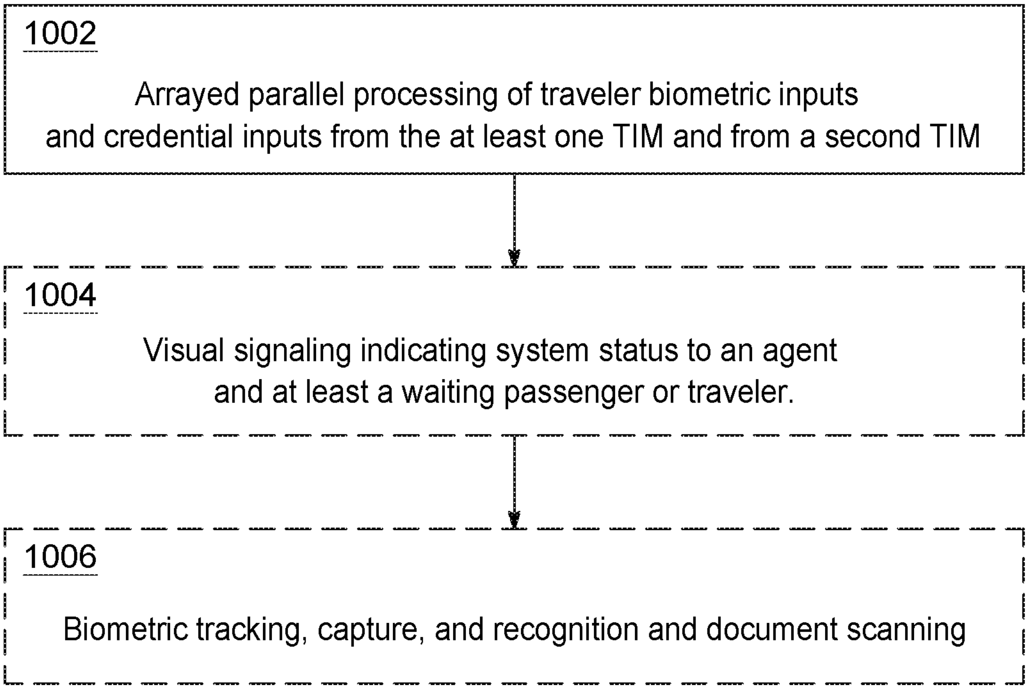
FIG. 10 illustrates a flow chart of a method in accordance with the embodiments.

In some embodiments as illustrated by FIG. 1C, a modular identity verification system 100 includes an agent interface module (AIM) 102 that interacts with at least one traveler interface module (TIM) 104 and one or more processors 103 operatively coupled to memory 107 having computer instructions which when executed by the one or more processors causes the one or more processors 103 to perform certain functions. In some embodiments, the function or functions can include one or more of the steps of the method 1000 shown in the flow chart of FIG. 10. In some embodiments, the function or functions can include the step 1002 of arrayed parallel processing of traveler biometric inputs and credential inputs from more than one TIM or from at least one TIM and from a second TIM. In some embodiments, the arrayed parallel processing can be of inputs from two, three or more TIMs.

In some embodiments, a further function can include the step 1004 of indicating a status to an agent and at least a waiting passenger using visual signaling indicating system. In some embodiments, another function can include the step 1006 of biometric tracking, capture, and recognition and document scanning. More particularly, such biometric tracking, capture and recognition can be the tracking, capture, and recognition of a live face in comparison to a face scanned from a document or other credential. In some embodiments, such biometric tracking, capture and recognition can involve fingerprints, hand prints, palm prints, iris scans, or even voice prints. The embodiments herein contemplate multimodal live biometric tracking, capture and recognition that can be used with corresponding information scanned or otherwise captured from credentials or document presented at the TIM or AIM.

In some embodiments as shown in the system 203 of FIG. 2D, the visual signaling indicating system 250 is an elevated light producing a green light indicating to the waiting passenger to proceed towards the TIM (204*a*, 204*b*, and/or 204*c*) or a red light indicating to the waiting passenger to continue to wait.

In some embodiments as shown in FIG. 2D, the agent interface module 102 further includes a transparent or translucent shield 101 separating the agent interface module 102 from the traveler interface module (204*a*, 204*b*, and 204*c*). The shield can be made of glass or plexiglass or other transparent or translucent material such as Lucite plastic sheets by Lucite International, Inc.

In some embodiments, the agent interface module 102 further includes a display 406 presenting processed inputs in parallel from two or more traveler interface modules.

Figure 8A:
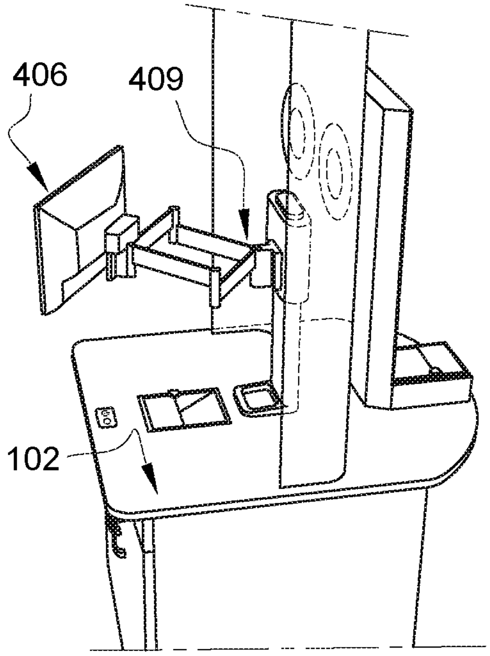
FIG. 8A illustrates a side view of a combined agent interface module (AIM) and traveler interface module with the AIM having an extensible display in accordance with the embodiments.
Figure 8B:
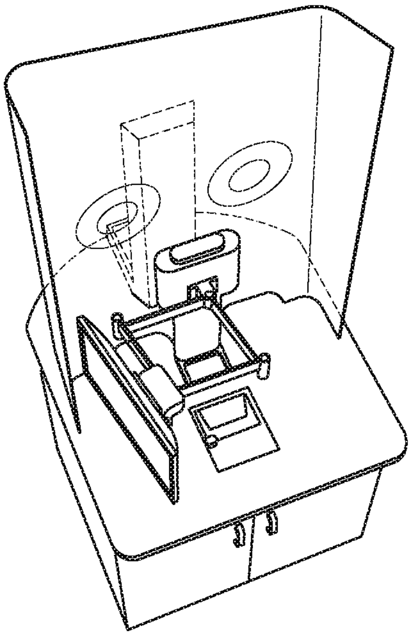
FIG. 8B illustrates a top perspective view of the unit of FIG. 8A in accordance with the embodiments.
Figure 8C:
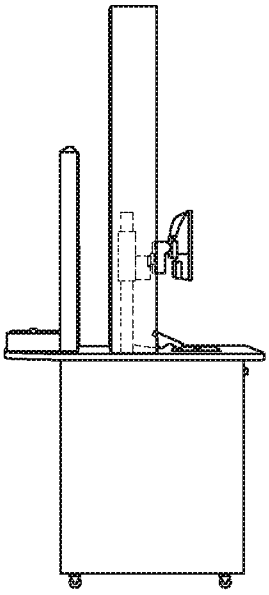
FIG. 8C illustrates a side view of the unit of FIG. 8A with the extensible display in a retracted mode in accordance with the embodiments.
Figure 8D:
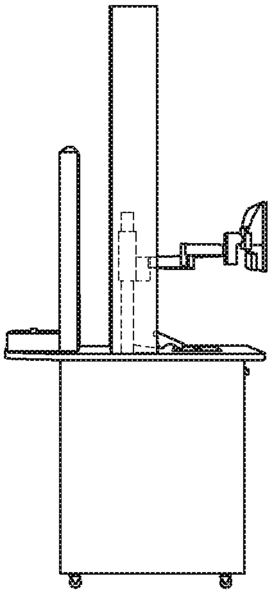
FIG. 8D illustrates a side view of the unit of FIG. 8C with the extensible display in an extended mode in accordance with the embodiments.

In some embodiments as shown in FIG. 2D, 4A or 8A, the display 406 can be mounted on an extensible and adjustable arm 409 allowing the agent to adjust the positioning of the display.

In some embodiments as shown in FIG. 3A, the travel interface module 300 includes a single document-scanning surface 301 for scanning multiple forms of credentials including phone displays, identity cards, and passports.

In some embodiments, an agent interface module 900 further includes a hot-swappable battery system 905 as shown in FIGS. 9A and 9B enabling continued usage without wired power.

In some embodiments as shown in FIG. 4A, the agent interface module 102 further includes a dedicated agent-facing document scanner 408 that scans multiple forms of credentials. In some embodiments, the agent interface module 102 can further include a separate identity scanner 414 in addition to a scanner (408) that scans multiple forms of credentials.

In some embodiments, the agent interface module is co-located in modular fashion with one (as shown in FIG. 2A), two (as shown in FIG. 2B), three (as shown in FIG. 2C) or more traveler interface modules. In some embodiments, the agent interface module is co-located in modular fashion with just one traveler interface module. In some embodiments, the agent interface module is a standalone unit that interfaces with one, two, three or more traveler interface modules that are not co-located with the agent interface module. (See FIGS. 3A, 3B, and 3C).

In some embodiments as shown in FIG. 1C, the agent interface module 102 has its own processor or processors (103) and the traveler interface module or modules 104 has or have its own respective processor or processors (303) for at least face tracking, capture, and recognition and for document scanning. The agent interface module can have its own processor or processor that can handle bus intensive functions independent of the processor or processors at the agent interface module.

In some embodiments, the agent interface module physically resides separate from one or more traveler interface modules and yet is enabled to process inputs in parallel from two or more traveler interface modules. (See block diagrams 4B, 4C, 4D, 4E, and 4F).

In some embodiments, a modular identity verification system 100 or 400 as shown in FIG. 1C or FIG. 4A respectively can include at least one traveler interface module (TIM) 104 or 300 having one or more processors (303) operatively coupled to memory 302 having computer instructions for at least biometric capture and recognition and for document scanning and the system 100 or 400 can further include an agent interface module (AIM) 102 having one or more processors 103 independent of the one or more processors of the TIM, where the one or more processors 103 are operatively coupled to memory 107 having computer instructions which when executed by the one or more processors 103 causes the one or more processors 103 to perform the functions of arrayed parallel processing (1002) of traveler biometric inputs and credential inputs from the at least one TIM 104 or 204*a* and from a second TIM (204*b*, etc).

In some embodiments, the system further includes a visual signaling indicating system (250) as shown in FIG. 2D that indicates a status to an agent and at least a waiting traveler. In some embodiments, the indicating system can be a portion of the AIM. In some other embodiments, the indicating system can be a portion of the TIM. In some embodiments, the indicating system can be a portion of both the AIM and the TIM.

In some embodiments, the agent interface module 102 further includes a transparent or translucent shield 101 separating the agent interface module from the traveler interface module as shown in FIG. 2D.

In some embodiments, the travel interface module 300 as shown in FIG. 3A includes a single document-scanning surface 301 for scanning multiple forms of credentials including phone displays, identity cards, and passports and the agent interface module 102 as shown in FIG. 4A separately includes a single document-scanning surface 408 for scanning multiple forms of credentials including phone displays, identity cards, and passports.

In the absence of any specific clarification related to its express use in a particular context, where the terms "substantial" or "about" or "usually" in any grammatical form are used as modifiers in the present disclosure and any appended claims (e.g., to modify a structure, a dimension, a measurement, or some other characteristic), it is understood that the characteristic may vary by up to 30 percent if applicable.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or idea.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As the context may require in this disclosure, except as the context may dictate otherwise, the singular shall mean the plural and vice versa. All pronouns shall mean and include the person, entity, firm or corporation to which they relate. Also, the masculine shall mean the feminine and vice versa.

When so arranged as described herein, each computing device or processor may be transformed from a generic and unspecific computing device or processor to a combination device comprising hardware and software configured for a specific and particular purpose providing more than conventional functions and solving a particular technical problem with a particular technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea. Furthermore, when interpreting the claims, the order of the elements may or may not be critical and it can be assumed in many instances that the order of certain functions can be performed either in the order presented in the claims or in a different order within contemplation of the scope of the embodiments.

The headings and Abstract of the Disclosure provided herein are for convenience only and do not limit or interpret the scope or meaning of the embodiments. The various embodiments described above can be combined to provide further embodiments. Aspects of the embodiments can be modified, if necessary to employ concepts of the various patents, application and publications to provide further embodiments.

The invention claimed is:

1. A modular identity verification system, comprising:

an agent interface module (AIM) that interacts with at least one traveler interface module (TIM); and one or more processors operatively coupled to memory having computer instructions which when executed by the one or more processors causes the one or more processors to perform the functions characterized by:

arrayed parallel processing at the AIM enabling a single agent to concurrently manage and process traveler biometric inputs and credential inputs received in parallel from a plurality of TIM including the at least one TIM and from a second TIM; and visual signaling indicating system indicating a status to an agent and at least a waiting passenger;

wherein the agent interface module further comprises a display presenting processed inputs in parallel from two or more traveler interface modules:

wherein the agent interface module has its own processor or processors and the traveler interface modules has its own processor or processors for at least face tracking. capture, and recognition and for document scanning:

wherein the agent interface module physically resides separate from one or more traveler interface modules and yet is enabled to process inputs in parallel from two or more traveler interface modules.

2. The system of claim 1, wherein the visual signaling indicating system comprises an elevated light producing a green light indicating to the waiting passenger to proceed towards the TIM or a red light indicating to the waiting passenger to continue to wait.

3. The system of claim 1, wherein the agent interface module further comprises a transparent or translucent shield separating the agent interface module from the traveler interface module.

4. The system of claim 1, wherein the travel interface module comprises a single document-scanning surface for scanning multiple forms of credentials including phone displays, identity cards, and passports.

5. The system of claim 1, wherein the agent interface module further comprises a hot-swappable battery system enabling continued usage without wired power.

6. The system of claim 1, wherein the agent interface module further comprises a dedicated agent-facing document scanner that scans multiple forms of credentials.

7. The system of claim 1, wherein the agent interface module is co-located in modular fashion with one, two, or three traveler interface modules.

8. The system of claim 1, wherein the agent interface module is co-located in modular fashion with two or more traveler interface modules.

9. A modular identity verification system, comprising:

at least one traveler interface module (TIM) having one or more processors operatively coupled to memory having computer instructions for at least biometric capture and recognition and for document scanning; and an agent interface module (AIM) having one or more processors independent of the one or more processors of the TIM and configured to receive and process inputs in parallel from a plurality of TIMs, wherein the one or more processors are operatively coupled to memory having computer instructions which when executed by the one or more processors causes the one or more processors to perform the functions characterized by:

arrayed parallel processing of traveler biometric inputs and credential inputs from the at least one TIM and from a second TIM;

further comprising a visual signaling indicating system that indicates a status to an agent and at least a waiting traveler;

wherein the agent interface module further comprises a transparent or translucent shield separating the agent interface module from the traveler interface module;

wherein the travel interface module comprises a single document-scanning surface for scanning multiple forms of credentials including phone displays, identity cards, and passports and the agent interface module separately comprises a single document-scanning surface for scanning multiple forms of credentials including phone displays, identity cards, and passports.

* * * * *